United States Patent
Rosen

(10) Patent No.: US 9,355,012 B2
(45) Date of Patent: May 31, 2016

(54) STEPPING AND APPLICATION STATE VIEWING BETWEEN POINTS

(71) Applicant: Microsoft Corporation, Redmond, WA (US)

(72) Inventor: Douglas J. Rosen, Woodinville, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 52 days.

(21) Appl. No.: 13/849,488

(22) Filed: Mar. 23, 2013

(65) Prior Publication Data

US 2013/0219366 A1 Aug. 22, 2013

Related U.S. Application Data

(63) Continuation of application No. 11/590,128, filed on Oct. 31, 2006, now Pat. No. 8,429,613.

(51) Int. Cl.
*G06F 9/44* (2006.01)
*G06F 11/36* (2006.01)

(52) U.S. Cl.
CPC .......... *G06F 11/362* (2013.01); *G06F 11/3624* (2013.01)

(58) Field of Classification Search
USPC ........................................................ 717/124
See application file for complete search history.

(56) References Cited

U.S. PATENT DOCUMENTS

| | | | |
|---|---|---|---|
| 5,124,989 A | 6/1992 | Padawer | |
| 5,295,260 A * | 3/1994 | Pribnow | 714/25 |
| 5,375,125 A | 12/1994 | Oshima | |
| 5,784,552 A * | 7/1998 | Bishop et al. | 714/38.12 |
| 5,845,125 A * | 12/1998 | Nishimura | G06F 11/3664 717/129 |
| 6,106,572 A | 8/2000 | Halpern | |
| 6,182,208 B1 * | 1/2001 | Peri | G06F 11/3648 712/227 |
| 6,263,456 B1 * | 7/2001 | Boxall | G06F 11/362 709/217 |
| 6,418,543 B1 * | 7/2002 | Goli | G06F 11/3688 717/125 |
| 6,543,049 B1 | 4/2003 | Bates | |
| 6,922,821 B1 * | 7/2005 | Nemecek | G06F 11/261 717/128 |
| 7,072,800 B1 * | 7/2006 | Fernandez et al. | 717/112 |

(Continued)

OTHER PUBLICATIONS

Lewis, "Debugging Backwards in Time", Oct. 9, 2003, Lambda Computer Science.*

(Continued)

*Primary Examiner* — Anna Deng
*Assistant Examiner* — Junchun Wu
(74) *Attorney, Agent, or Firm* — Kate Drakos; Kevin Sullivan; Micky Minhas

(57) ABSTRACT

Various technologies and techniques are disclosed for providing stepping and state viewing in a debugger application. A start and end breakpoint are assigned. Source code execution begins, and upon reaching the start breakpoint, a logging feature begins storing one or more values that may be impacted upon execution of code between the start breakpoint and an end breakpoint. More lines of source code are executed until the end breakpoint is reached. When the end breakpoint is reached, the debugger is put into break mode. While in break mode, a playback feature is provided to allow a user to play back a path of execution that occurred between the start breakpoint and the end breakpoint. The playback feature uses at least some of the values that were stored with the logging feature to show how each referenced variable changed in value.

15 Claims, 7 Drawing Sheets

(56) References Cited

U.S. PATENT DOCUMENTS

| | | | |
|---|---|---|---|
| 7,337,433 | B2 | 2/2008 | Cyran |
| 7,647,631 | B2 | 1/2010 | Sima |
| 8,090,989 | B2 | 1/2012 | Law |
| 2002/0087950 | A1 | 7/2002 | Brodeur |
| 2002/0174415 | A1 | 11/2002 | Hines |
| 2003/0142122 | A1* | 7/2003 | Straut et al. ............ 345/704 |
| 2004/0059809 | A1 | 3/2004 | Benedikt |
| 2004/0064351 | A1 | 4/2004 | Mikurak |
| 2004/0210876 | A1 | 10/2004 | Stall |
| 2004/0268310 | A1 | 12/2004 | Morgan |
| 2005/0010908 | A1* | 1/2005 | Funk ............ G06F 11/3648 717/124 |
| 2005/0108689 | A1 | 5/2005 | Hooper |
| 2005/0216792 | A1 | 9/2005 | Tsuboi |
| 2005/0229154 | A1* | 10/2005 | Hiew et al. ............ 717/110 |
| 2005/0251794 | A1* | 11/2005 | Taylor ............ G06F 11/3664 717/125 |
| 2006/0101405 | A1* | 5/2006 | Buschardt ............ G06F 11/3636 717/124 |
| 2006/0206873 | A1 | 9/2006 | Argade |
| 2007/0234298 | A1 | 10/2007 | Hirai |
| 2008/0052683 | A1* | 2/2008 | Bates et al. ............ 717/129 |
| 2008/0120605 | A1* | 5/2008 | Rosen ............ G06F 11/362 717/129 |
| 2011/0296246 | A1 | 12/2011 | Cooper |
| 2011/0321017 | A1* | 12/2011 | Kapoor ............ G06F 11/362 717/129 |
| 2012/0089410 | A1 | 4/2012 | Mikurak |

OTHER PUBLICATIONS

Vermeulen et al., "Automatic Generation of Breakpoint Hardware for Silicon Debug", Jun. 7-11, 2004, ACM.*

Buck et al., "An API for Runtime Code Patching", Winter 2000, The International Journal of High Performance Computing Applications, vol. 14, No. 4, pp. 317-329.*

Bob Boothe, "Efficient Algorithms for Bidirectional Debugging", 2000, ACM.

Thomas Moher, "Provide: A Process Visualization and Debugging Environment", IEEE, Jun. 1988, vol. 14 No. 6, 1988.

Bill Lewis, "Debugging Backwards in Time", Oct. 2003, Fifth Int. Workshop on Automated and Algorithmic Debugging, p. 225-235.

Yasushi Saito, "Jockey: A User-space Library for Record-replay Debugging", Sep. 2005, AADEBUG '05, p. 69-76.

Agrawal, "An Execution, Backtracking Approach to Debugging", May 1991.

Boothe, "A Fully Capable Bidirectional Debugger", Jan. 2000, p. 36, vol. 25, No. 1.

U.S. Appl. No. 11/590,128, filed Oct. 31, 2006, Rosen.

Agarwal, "An Execution-Backtracking Approach to Debugging", May 1991.

Boothe, "A Fully Capable Bidirectional Debugger", Software Engineering Notes, Jan. 2000.

Boothe, "Efficient Algorithms for Bidirectional Debugging", In Proceedings of the ACM SIGPLAN Conference on Programming Language Design and Implementation, Jun. 18-21, 2000.

Lewis, "Debugging Backwards in Time", In Proceedings of the 5th International Workshop on Automated and Algorithmic Debugging, Oct. 2003.

Moher, "Provide: A Process Visualization and Debugging Environment", IEEE Transactions on Software Engineering, Jun. 1988.

Saito, "Jockey: A User-Space Library for Record-Replay Debugging", In Proceedings of the 6th International Symposium on Automated and Analysis -Driven Debugging, Sep. 19-21, 2005.

* cited by examiner

WINDOWSAPPLICATION2

FILE  EDIT  VIEW  PROJECT  BUILD  DEBUG  DATA  TOOLS  WINDOW  COMMUNITY  HELP

START PAGE | FORM1.VB* | FORM1.VB [DESIGN]*

(GENERAL) ▼ | (DECLARATIONS) ▼

```
PUBLIC CLASS FORM1
    PRIVATE SUB CMDPRESSME_CLICK (SENDER AS SYSTEM.OBJECT, E AS SYSTEM.EVENTARGS)
    HANDLES CMD PRESSME.CLICK
        DIM INTAGE AS INTEGER                    484
        DIM INTRETIREMENT AS INTEGER              ↙
        INTAGE = INPUTBOX ("ENTER YOUR AGE", "AGE?")

INTRETIREMENT = 65 - INTAGE
        MSGBOX ("YOU ONLY HAVE" & INTRETIREMENT & " YEARS UNTIL RETIREMENT")
        IF INTRETIREMENT < 10 THEN
            STARTSAVING()
        END IF    ← 488
    END SUB
    PRIVATE SUB STARTSAVING ()

MSGBOX ("YOU BETTER START SAVING YOUR MONEY IF YOU HAVEN'T ALREADY!")

END SUB
END CLASS
```

STEPPING AND APPLICATION STATE VIEWING BETWEEN POINTS

RELATED APPLICATIONS

This application is a continuation of and claims benefit from U.S. patent application Ser. No. 11/590,128 that was filed on Oct. 31, 2006, and that is incorporated herein by reference in its entirety.

BACKGROUND

Most software development tools such as MICROSOFT® Visual Studio have debuggers that allow the software developer to debug the code and enter, break mode at a particular point in time to watch the code execution more carefully to locate an error. When a debugger breaks into the code in break mode when an exception occurs, it is not very easy to determine what caused the exception because the changes to the data and the path of execution through the application are not remembered by the debugger or the platform. Some debuggers have attempted to solve this problem by just recording every activity that happens during execution, such as recording every data value as it changes and the entire execution path. The problem with such an approach is that there is a huge overhead involved in recording every activity for an entire application as the values change and as every execution path is taken.

SUMMARY

Various technologies and techniques are disclosed for providing stepping and state viewing in a debugger application. A start breakpoint and an end breakpoint are assigned, such as by a user and/or programmatically. Source code execution begins, and upon reaching the start breakpoint, a logging feature begins storing one or more values that may be impacted upon execution of code between the start breakpoint and an end breakpoint. More lines of source code are executed until the end breakpoint is reached. When the end breakpoint is reached, the debugger is put into break mode. In one implementation, the logging feature stops logging when break mode is entered.

While in break mode, a playback feature is provided to allow a user to play back a path of execution that occurred between the start breakpoint and the end breakpoint. The playback feature uses at least some of the values that were stored with the logging feature to show how each referenced variable changed in value. In one implementation, the playback is bidirectional, allowing the user to move forward and/or backward in time to play back how the values and/or state of the application changed. In one implementation, as playback occurs, the user is able to see the current and ending values of each referenced variable, such as in a locals window.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is a simulated screen for one implementation of the system of FIG. 1 that illustrates setting start and end breakpoints in a debugger.

DETAILED DESCRIPTION

Figure 1:
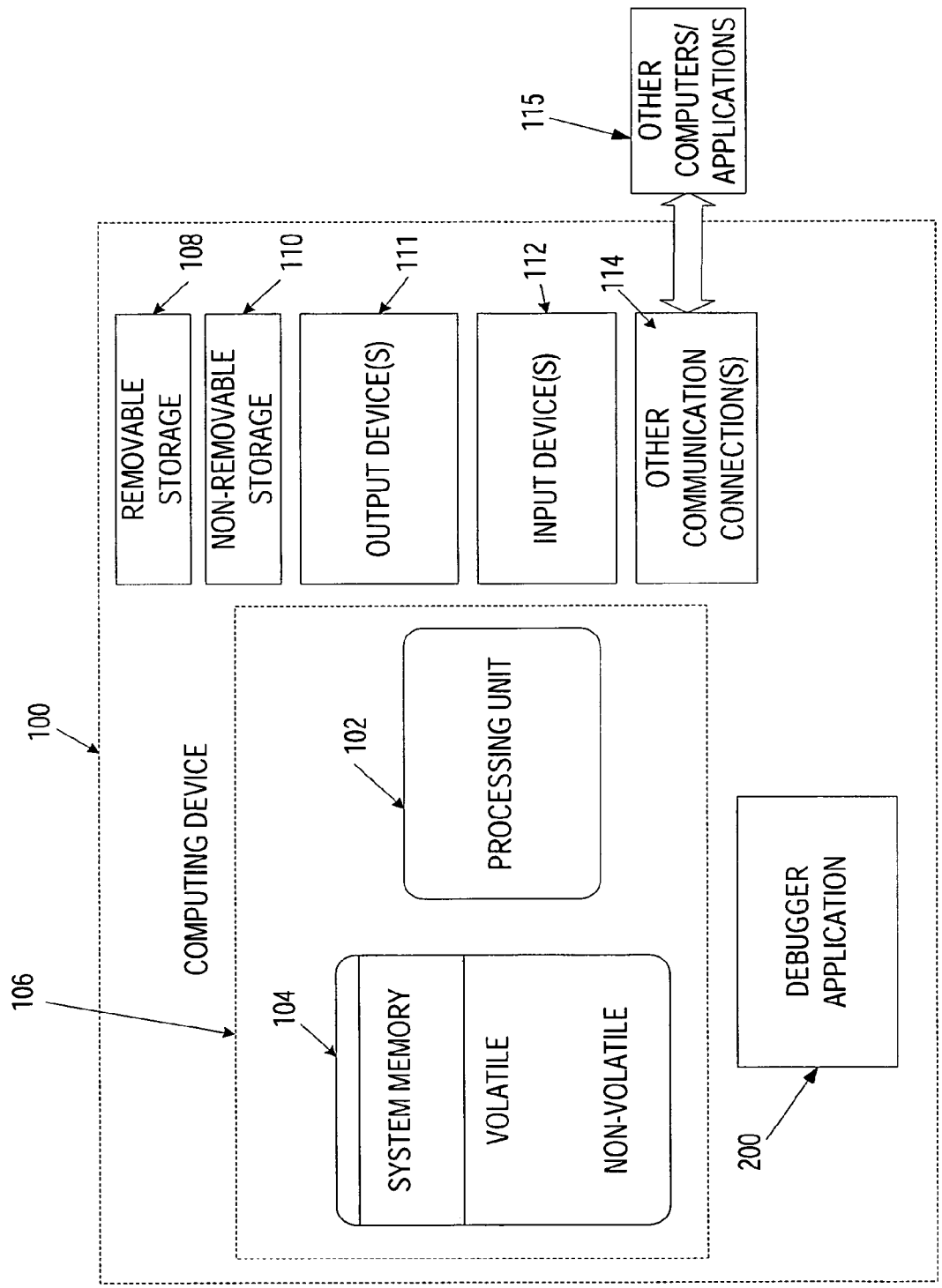
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further application of the principles as described herein are contemplated as would normally occur to one skilled in the art.

The system may be described in the general context as a software development application that provides debugging features, but the system also serves other purposes in addition to these. In one implementation, one or more of the techniques described herein can be implemented as features within a software development program such as MICROSOFT® Visual Studio, or from any other type of program or service that allows for debugging the operation of software. A start breakpoint and an end breakpoint are assigned, such as by a user and/or programmatically. Source code execution begins, and upon reaching the start breakpoint, a logging feature begins storing one or more values that may be impacted upon execution of code between the start breakpoint and an end breakpoint, along with the source locations visited. The phrase "values that may be impacted" as used herein is meant to include any values or states that could be touched and/or changed by code that executes between the start breakpoint and end breakpoint (whether or not the value or state actually changed). Non-limiting examples of "values that may be impacted" include referenced variables in a particular function. The phrase "source location" is meant to include all the source locations visited during the execution of the application between the start and end breakpoint, regardless of whether or not a variable change takes place at that location. These source locations are then used to assist in playing back a path of execution later. More lines of source code are executed until the end breakpoint is reached. When the end breakpoint is reached, the debugger is put into break mode. While in break mode, a playback feature is provided to allow a user to play back the path of execution that occurred between the start breakpoint and the end breakpoint, and/or to view how the referenced variable values changed.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100. Further, the terms "computer storage device" and "computer storage media" and the like as used herein strictly refer to an apparatus(es) or article (s) of manufacture or the like.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes debugger application 200. Debugger application 200 will be described in further detail in FIG. 2.

Figure 2:
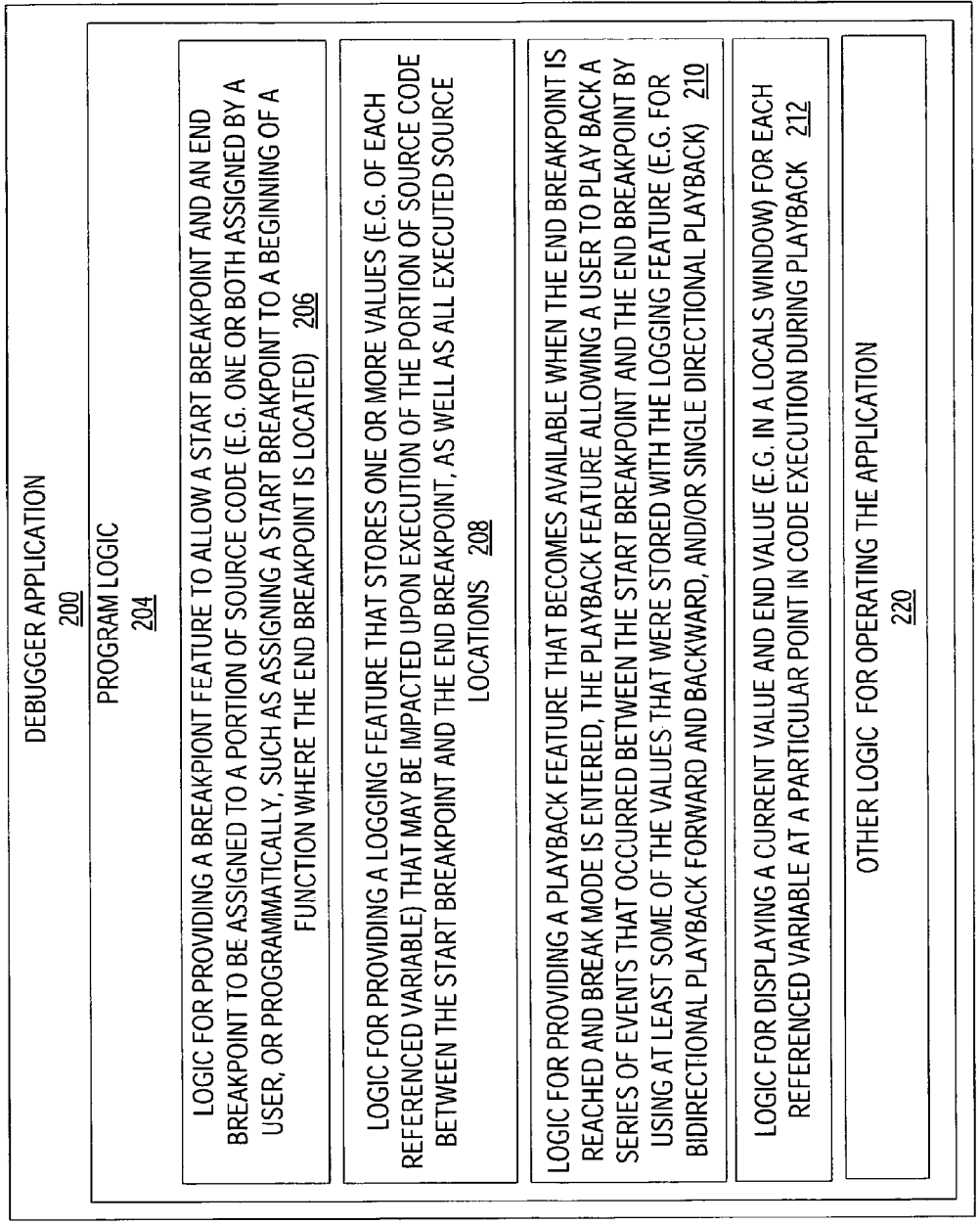
FIG. 2 is a diagrammatic view of a debugger application of one implementation operating on the computer system of FIG. 1.

Turning now to FIG. 2 with continued reference to FIG. 1, debugger application 200 operating on computing device 100 is illustrated, Debugger application 200 is one of the application programs that reside on computing device 100. However, it will be understood that debugger application 200 can alternatively or additionally be embodied as computer-executable instructions on one or more computers and/or in different variations than shown on FIG. 1. Alternatively or additionally, one or more parts of debugger application 200 can be part of system memory 104, on other computers and/or applications 115, or other such variations as would occur to one in the computer software art.

Debugger application 200 includes program logic 204, which is responsible for carrying out some or all of the techniques described herein. Program logic 204 includes logic for providing a breakpoint feature to allow a start breakpoint and an end breakpoint to be assigned to a portion of source code (e.g. one or both assigned by a user, or programmatically, such as assigning a start breakpoint to a beginning of a function where the end breakpoint is located) 206; logic for providing a logging feature that stores one or ore values (e.g. of each referenced variable) that may be impacted upon execution of the portion of source code between the start breakpoint and the end breakpoint, as well s all executed source locations 208; logic for providing a playback feature that becomes available when the end breakpoint is reached and break mode is entered, the playback feature allowing a user to play back a path of execution that occurred between the start breakpoint and the end breakpoint by using at least some of the values that were stored with the logging feature (e.g. for bidirectional playback forward and backward, and/or single directional playback) 210; logic for displaying a current value and an end value (e.g. in a locals window) for each referenced variable at a particular point in code execution during playback 212; and other logic for operating the application 220. In one implementation, program logic 204 is operable to be called programmatically from another program, such as using a single call to a procedure in program logic 204.

Figure 3:
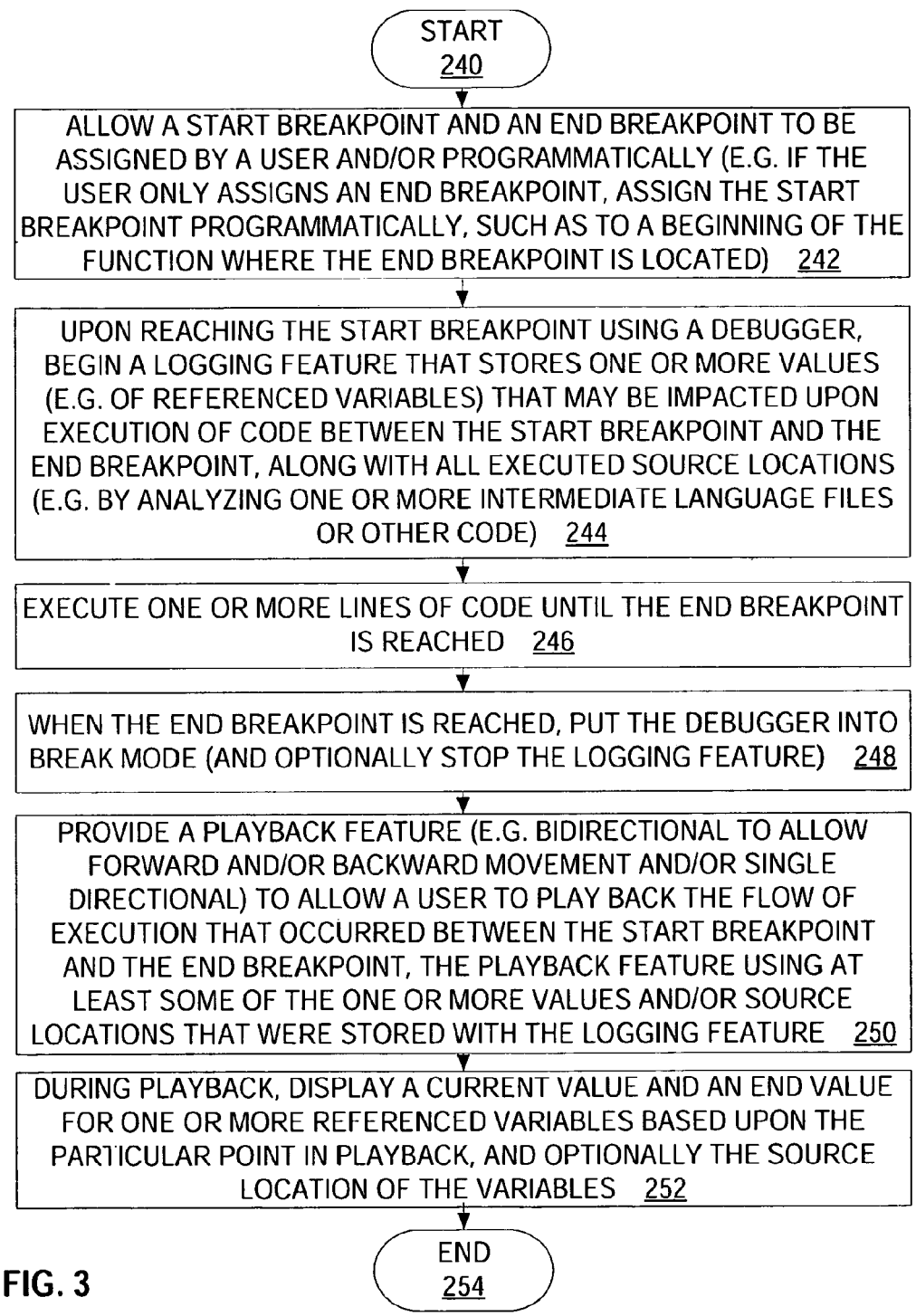
FIG. 3 is a process flow diagram for one implementation of the system of FIG. 1 illustrating the stages involved in providing a stepping and state viewing debugger.
Figure 4:
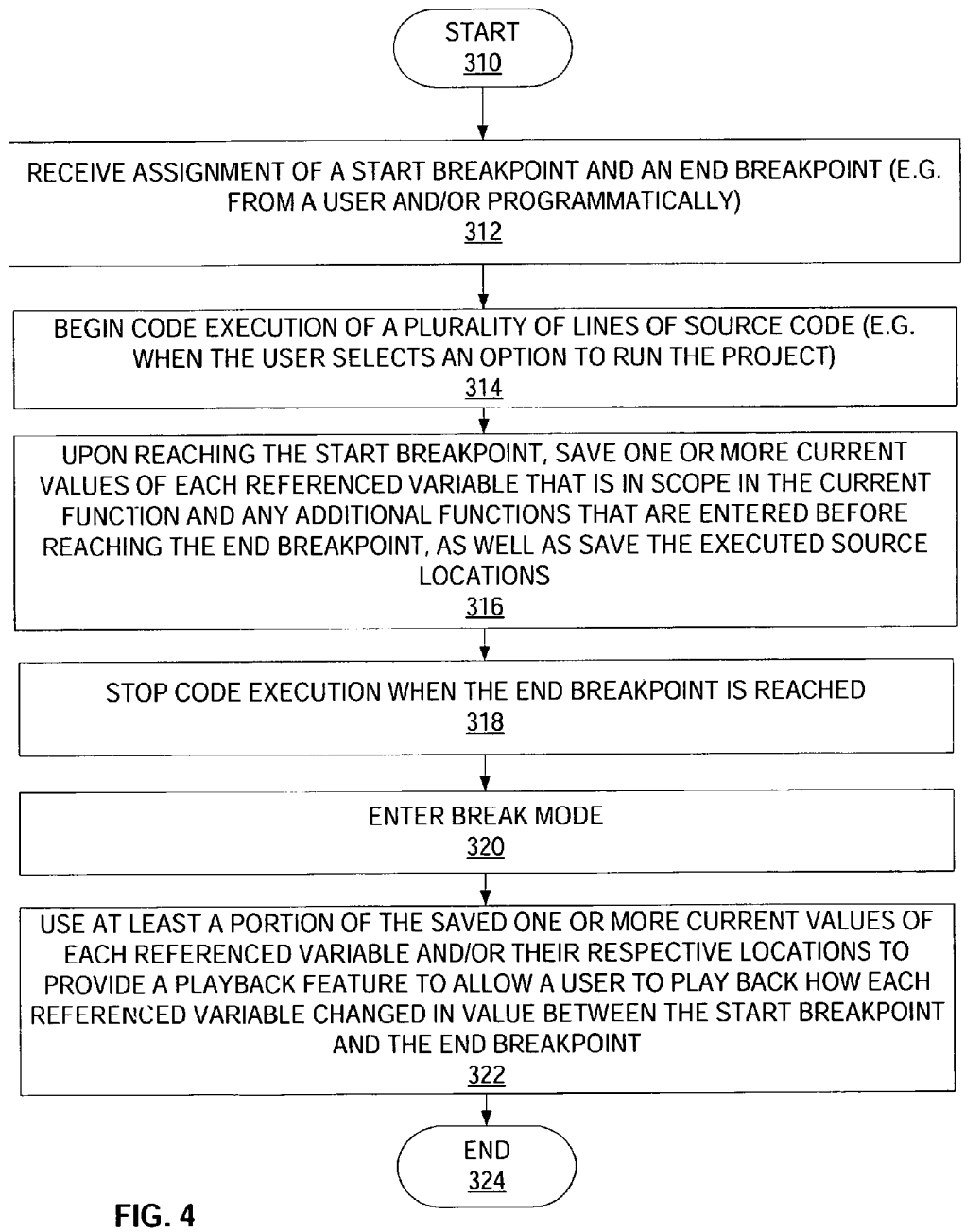
FIG. 4 is a process flow diagram for one implementation of the system of FIG. 1 illustrating the stages involved in using the stepping and state viewing debugger to debug an application.
Figure 5:
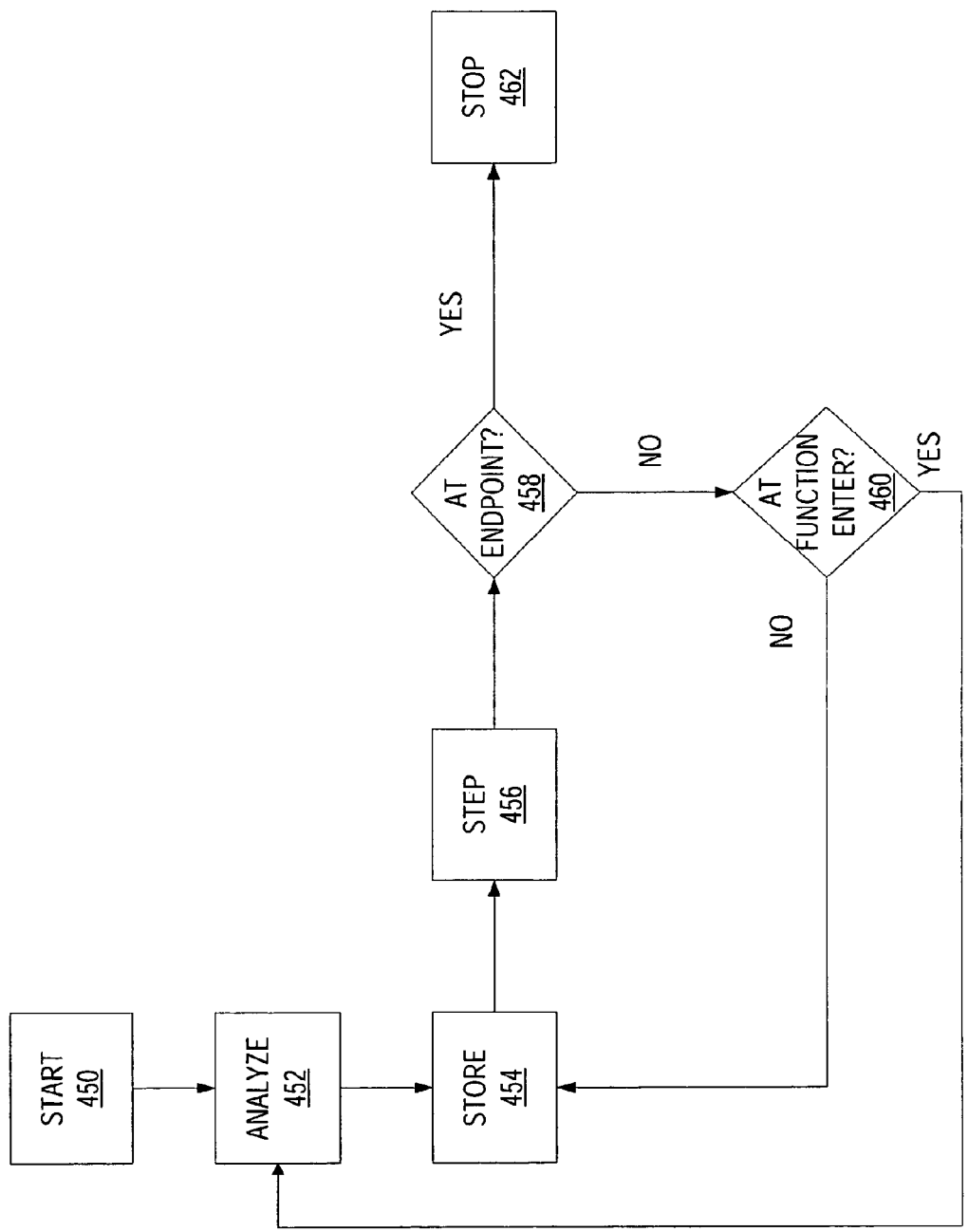
FIG. 5 is a process flow diagram for one implementation of the system of FIG. 1 illustrating the stages involved in providing the logging feature for analyzing and recording values and the source locations visited, between the start and end breakpoints.

Turning now to FIGS. 3-5 with continued reference to FIGS. 1-2, the stages for implementing one or more implementations of debugger application 200 are described in further detail. FIG. 3 is a process flow diagram for debugger application 200 illustrating the stages involved in providing a stepping and state viewing debugger. In one form, the process of FIG. 3 is at least partially implemented in the operating logic of computing device 100. The procedure begins at start point 240 with allowing a start breakpoint and an end breakpoint to be assigned by a user and/or programmatically (e.g. if the user only assigns an end breakpoint, assign the start breakpoint programmatically, such as to a beginning of the function where the end breakpoint is located) (stage 242). Upon reaching the start breakpoint using a debugger, begin a logging feature that stores one or more values (such as referenced values) that may be impacted upon execution of code between the star(breakpoint and the end breakpoint, along with all executed source locations (stage 244). A few non-limiting, examples of referenced values that may be impacted include local variables in scope and/or each variable reference present in a current function. In one implementation, one or more intermediate language files or other code or other code are analyzed to help determine which values may change (stage 244). One or more lines of code are executed until the end breakpoint is reached (stage 246).

When the end breakpoint is reached, the debugger is put into break mode (and optionally stop the logging feature) (stage 248). A playback feature (e.g. bidirectional to allow forward and/or backward movement, and/or single directional) is provided to allow a user to play back a path of execution that occurred between the start breakpoint and the end breakpoint (stage 250). In one implementation, a start option, stop option, and slider option are used to control this playback in one or more directions. The playback feature uses at least some of the one or more values and/or the executed source locations that were stored with the logging feature (stage 250). During playback, a current value and an ending value are displayed, such as in a locals window, for one or more referenced variables based upon the particular point in playback (stage 252). In one implementation, the source location of each of the one or more referenced variables is also displayed (stage 252). The process ends at end point 254.

FIG. 4 illustrates one implementation of the stages involved in using the stepping and state viewing debugger to debug an application. In one form, the process of FIG. 4 is at least partially implemented in the operating logic of computing device 100. The procedure begins at start point 310 with receiving assignment of a start breakpoint and an end breakpoint (e.g. from a user and/or programmatically) (stage 312). Code execution is started for a plurality of lines of source code (e.g. when the user selects an option to run the project) (stage 314). Upon reaching the start breakpoint, one or more current values are saved for each referenced variable that is in scope in the current function and any additional functions that are entered before reaching the end breakpoint (stage 316). The executed source locations are also saved (stage 316). Code execution is stopped when the end breakpoint is reached (stage 318), and break mode is then entered (stage 320). Using at least a portion of the saved one or more current values of each referenced variable and/or the executed source locations, a playback feature is provided to allow a user to play back how each referenced variable changed in value between the start breakpoint and the end breakpoint (e.g. forward and/or backward) (stage 322). The process ends at end point 324.

FIG. 5 illustrates one implementation of the stages involved in providing the logging feature to analyze and record values between the start and end breakpoints. In one form, the process of FIG. 5 is at least partially implemented in the operating logic of computing device 100. The procedure begins at start point 450 with the code execution reaching the start breakpoint. The intermediate language code of the current function is analyzed (stage 452). The intermediate language is scanned for any field references, which are stored (stage 454). Any referenced variables that are in scope are inspected to get their values and are stored along with the values of the previously discovered field references (stage 454). In one implementation, one goal is to store only the values of those variables that may be touched by the code to be executed, as opposed to a complete dump of the heap.

A source level step is then executed (stage 456) execute the next line of source code. When the step completes, the debugger application 200 checks to see if the instruction pointer is at the end breakpoint (decision point 458). If the instruction pointer is not at the end breakpoint (decision point 458), then the debugger application 200 checks to see if another function was entered. If another function was entered (decision point 460), then the intermediate language code of the current function is analyzed (stage 452) and the field reference values and referenced variable values are stored (stage 454). Another step is then taken to execute the next line of source code (stage 456). If another function was not entered (decision point 460), then the referenced variables that are in scope along with the current values for the field references are stored (stage 454). Once the instruction pointer is at the end breakpoint (decision point 458), then the system is put into break mode (stage 462) and the process ends.

Figure 7:
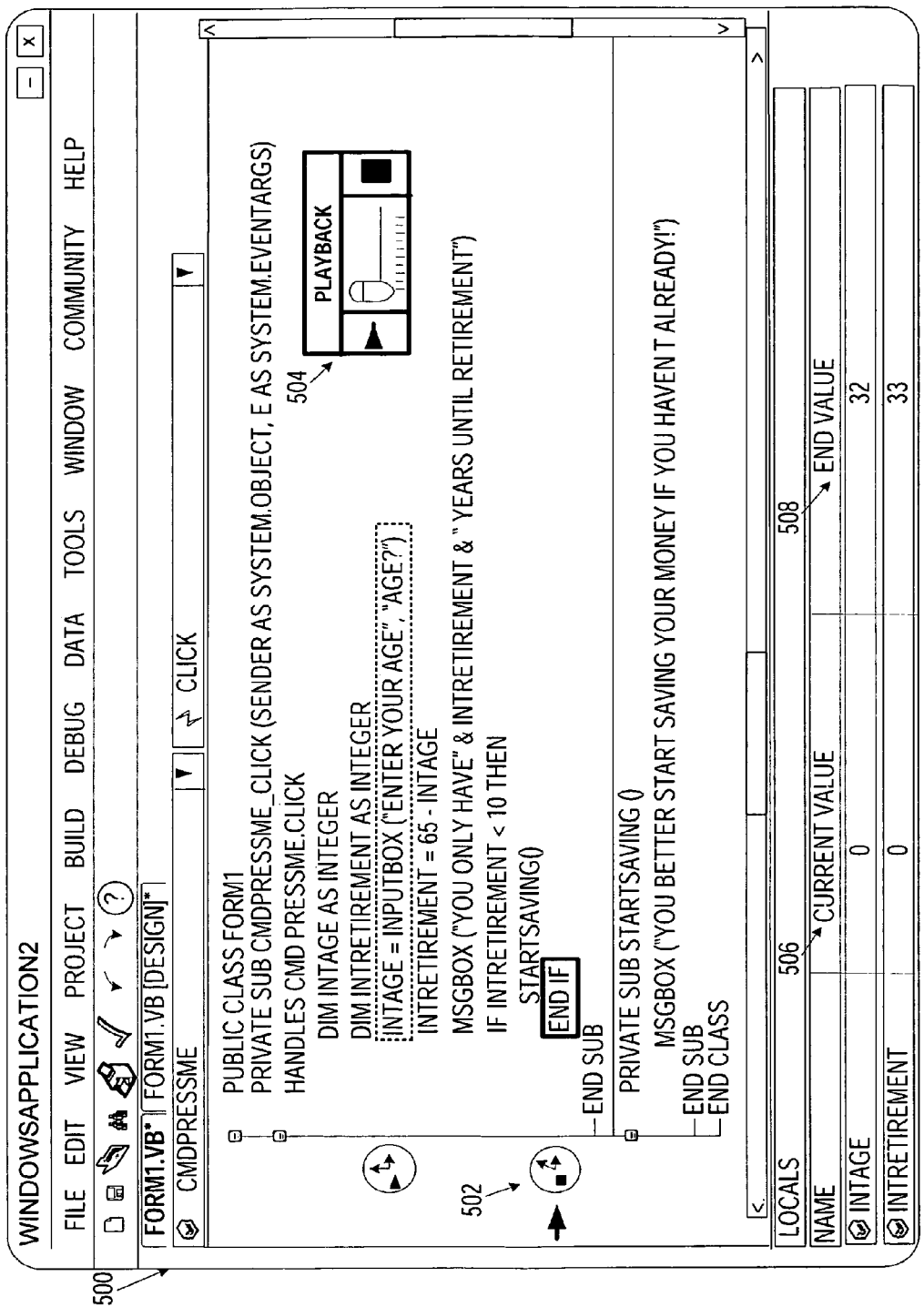
FIG. 7 is a simulated screen for one implementation of the system of FIG. 1 that illustrates entering debug mode upon hitting a start breakpoint.

Turning now to FIGS. 6 and 7, simulated screens are shown to illustrate the stepping and state viewing of debugger application 200 as described in FIGS. 2-5 in further detail. FIG. 6 is a simulated screen 480 for one implementation of the system of FIG. 1 that illustrates setting start and end breakpoints in a debugger. Start breakpoint 482 has been assigned to code line 484, and end breakpoint 486 has been assigned to code line 488. Turning now to FIG. 7, simulated screen 500 illustrates that when end breakpoint 502 (486 on FIG. 6) is reached, debugger application 200 breaks into debug mode. Using the playback toolbar 504, the user can then specify to start or stop the playback, as well as to jump forward or backward in the execution timeline (e.g. using the slider or other feature). As the playback is manipulated, the locals window displays the current value 506 and the end value 508 for each of the referenced variables. This allows the user to see what the current value for the variable based on the current line of code being executed, and what that value was when the function ended. In one implementation, the locals window also displays where in the source code the program was at that point in time (e.g. the respective source location of the particular referenced variable).

In one implementation, by using the playback feature, the user can move the instruction pointer back in time to see the execution path through the function and see the values of important data and how it changed as execution occurred. In one implementation, by only saving the values that the user has deemed interesting (e.g. those affected between the start and end breakpoints), a reasonable level of performance is achieved while allowing the user to have more helpful debugging features.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computing device comprising:
   a processor configured to execute lines of code; and
   memory that comprises the code; and
   a debugger configured to:
      assign a start breakpoint at a line of the code and an end breakpoint at another line of the code;
      start, based on the start breakpoint upon execution of the line of code at which the start breakpoint is assigned, logging of the lines of code being executed;
      stop, based on the stop breakpoint being encountered upon execution of the another line of code, the logging;
      enable starting and stopping of playback of the logged code;
      enable moving forward and backward to any line in the playback of the logged code; and
      present the any line in the playback of the logged code.

2. The computing device of claim 1 where the moving forward and backward is enabled based on a slider control of a user interface of the debugger.

3. The computing device of claim 1, the debugger further configured to display, in a user interface of the debugger, a current value and an ending value of at least one variable.

4. The computing device of claim 1, the debugger further configured to display, in a user interface of the debugger, an execution path through the logged code.

5. The computing device of claim 4, the debugger further configured to display, in the user interface of the debugger, values of variables as they changed in the execution path.

6. A method performed on a computing device that includes a processor, memory, and a debugger, the method comprising:
   assigning a start breakpoint at a line of code and an end breakpoint at another line of the code;
   executing, by the computing device subsequent to the assigning, lines of the code;
   starting, by the computing device via the debugger based on the start breakpoint being encountered upon execution of the line of code, logging of the executing lines of code;

stopping, by the computing device via the debugger based on the stop breakpoint being encountered upon execution of the another line of code, the logging;

enabling, by the computing device via the debugger, starting and stopping of playback of the logged code;

enabling, by the computing device via the debugger, moving forward and backward to any line in the playback of the logged code; and presenting, by the computing device via the debugger, the any line in the playback of the logged code.

7. The method of claim 6 where the enabling the moving forward and backward is based on a slider control of a user interface of the debugger.

8. The method of claim 6 where the presenting further comprises displaying, in a user interface of the debugger, a current value and an ending value of at least one variable.

9. The method of claim 6 further comprising displaying, in a user interface of the debugger, an execution path through the logged code.

10. The method of claim 9 further comprising displaying, in the user interface of the debugger, values of variables as they changed in the execution path.

11. At least one hardware computer storage device storing computer-executable instructions that, based on execution by a processor of a computing device that includes memory and a debugger, configure the computing device to perform actions comprising:

assigning a start breakpoint at a line of code and an end breakpoint at another line of the code;

executing, by the computing device subsequent to the assigning, lines of the code;

starting, by the computing device via the debugger based on the start breakpoint being encountered upon execution of the line of code, logging of the executing lines of code;

stopping, by the computing device via the debugger based on the stop breakpoint being encountered upon execution of the another line of code, the logging;

enabling, by the computing device via the debugger, starting and stopping of playback of the logged code;

enabling, by the computing device via the debugger, moving forward and backward to any line in the playback of the logged code; and presenting, by the computing device via the debugger, the any line in the playback of the logged code.

12. The at least one computer storage device of claim 11 where the enabling the moving forward and backward is based on a slider control of a user interface of the debugger.

13. The at least one computer storage device of claim 11 where the presenting further comprises displaying, in a user interface of the debugger, a current value and an ending value of at least one variable.

14. The at least one computer storage device of claim 11, the actions further comprising displaying, in a user interface of the debugger, an execution path through the logged code.

15. The at least one computer storage device of claim 14, the actions further comprising displaying, in the user interface of the debugger, values of variables as they changed in the execution path.

* * * * *